(12) United States Patent  
Wang et al.

(10) Patent No.: US 9,513,413 B2  
(45) Date of Patent: Dec. 6, 2016

(54) DISPLAY DEVICE, COLOR FILTER SUBSTRATE AND MANUFACTURING METHOD THEREOF

(71) Applicant: BOE Technology Group Co., Ltd., Beijing (CN)

(72) Inventors: Can Wang, Beijing (CN); Yonglian Qi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 256 days.

(21) Appl. No.: 13/974,491

(22) Filed: Aug. 23, 2013

(65) Prior Publication Data

US 2014/0055879 A1     Feb. 27, 2014

(30) Foreign Application Priority Data

Aug. 24, 2012   (CN) .......................... 2012 1 0306324

(51) Int. Cl.
*G02B 5/20*      (2006.01)
*G02B 5/22*      (2006.01)

(52) U.S. Cl.
CPC .............. *G02B 5/201* (2013.01); *G02B 5/223* (2013.01)

(58) Field of Classification Search
CPC .......... G02B 5/201; G02B 1/116; G02B 5/20; G02B 5/207; G02B 5/286; G02B 5/003; G02B 5/223; G02F 1/133514; G02F 1/133512; G02F 1/133516; G02F 1/13394; G02F 1/167; G02F 2001/133519; G02F 2201/52; G02F 2001/1333; G02F 1/13392
USPC ....... 359/885, 891, 892, 580, 582, 585, 589; 313/582–587; 349/106, 155, 156, 157
See application file for complete search history.

(56) References Cited

U.S. PATENT DOCUMENTS

| | | |
|---|---|---|
| 2006/0066781 A1 | 3/2006 | Kim et al. |
| 2006/0238694 A1 | 10/2006 | Chen et al. |
| 2009/0086134 A1 | 4/2009 | Yao et al. |
| 2009/0122226 A1 | 5/2009 | Hwang et al. |
| 2015/0185379 A1 | 7/2015 | Hui et al. |

FOREIGN PATENT DOCUMENTS

| | | |
|---|---|---|
| CN | 101120281 A | 2/2008 |
| CN | 100462803 C | 2/2009 |
| CN | 101398562 A | 4/2009 |
| CN | 101989004 A | 3/2011 |
| CN | 102654594 A | 9/2012 |
| CN | 102778781 A | 11/2012 |
| CN | 202563214 U | 11/2012 |
| JP | 11212075 A | 8/1999 |

(Continued)

OTHER PUBLICATIONS

The State Intellectual Property Office of the People's Republic of China ("SIPO") (Chinese Language) Office Action issued on Mar. 20, 2014 by SIPO in Chinese Patent Application No. 201210306324.9; seven (7) pages.

(Continued)

*Primary Examiner* — Bumsuk Won
*Assistant Examiner* — Wen Huang
(74) *Attorney, Agent, or Firm* — Ladas & Parry LLP (57) ABSTRACT

A color filter substrate is provided, comprising: a substrate comprising a plurality of pixel regions arranged in matrix; a color resin layer formed in each of the pixel regions on the substrate; and a transparent pillar formed on the substrate and located in the color resin layer. In addition, a manufacturing method for the color filter substrate is also provided.

16 Claims, 8 Drawing Sheets

(56) References Cited

FOREIGN PATENT DOCUMENTS

JP 2003279918 A 10/2003

OTHER PUBLICATIONS

English Translation of The State Intellectual Property Office of the People's Republic of China ("SIPO") Office Action issued on Mar. 20, 2014 by SIPO in Chinese Patent Application No. 201210306324.9; six (6) pages.

DISPLAY DEVICE, COLOR FILTER SUBSTRATE AND MANUFACTURING METHOD THEREOF

CROSS REFERENCE TO RELATED APPLICATIONS

This application claims priority from Chinese National Application No. 201210306324.9 filed Aug. 24, 2012, the contents of which are incorporated herein by reference.

BACKGROUND

The present invention relates to a display device, a color filter substrate and a manufacturing method thereof.

Color filter substrate (CF) is an important component of a thin film transistor liquid crystal display (TFT-LCD). A liquid crystal display mainly depends on the color filter substrate to be able to present colorful images. White light from the backlight transmits through the liquid crystal layer and irradiates on the color filter substrate. Then it passes through red, green and blue color filters corresponding to each pixel on the color filter substrate and form red, green and blue lights. They are finally mixed into color images in human eyes. The color filter substrate accounts for significant costs in a TFT-LCD display panel. For a 15 in. panel, the color filter substrate accounts for about 24% in terms of material cost. It's convenient to realize color display with color filter substrates and it is possible to obtain quite high color purity and relatively wide color reproduction range, therefore this manner has become a dominant manner for multi-colorized or full colorized liquid crystal displays.

Figure 1:
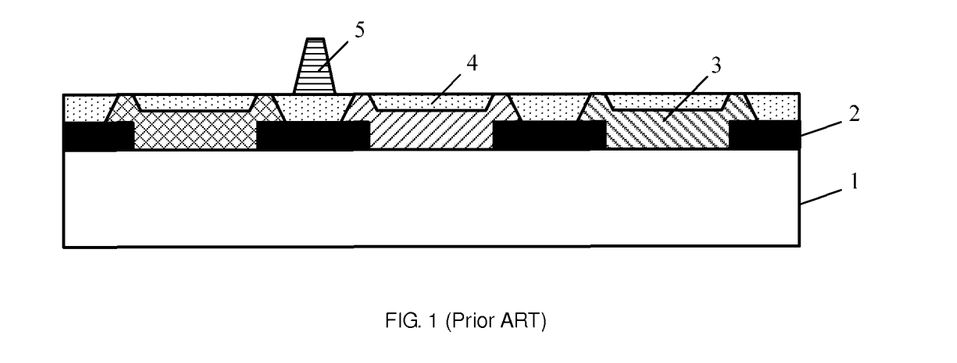
FIG. 1 is a structural representation of a conventional color filter substrate.

As shown in FIG. 1, a conventional color filter substrate includes: a substrate 1; a black matrix 2 formed on the substrate 1; a color resin layer 3 formed in exposed pixel regions of the black matrix 2, which includes a red resin layer (R, denoted by right oblique lines in the figure), a green resin layer (G, denoted by mesh lines in the figure) and a blue resin layer (B, denoted by left oblique lines in the figure); a planarization layer 4 formed on the substrate 1 with the color resin layer 3 formed thereon; and spacer (PS) 5 formed on the planarization layer 4. In case of a twisted nematic (TN) liquid crystal panel, a transparent conductive layer (not shown in Figs.) is further disposed in the color filter substrate, which is over the planarization layer 4 and on which is formed the spacer 5.

Figure 2:
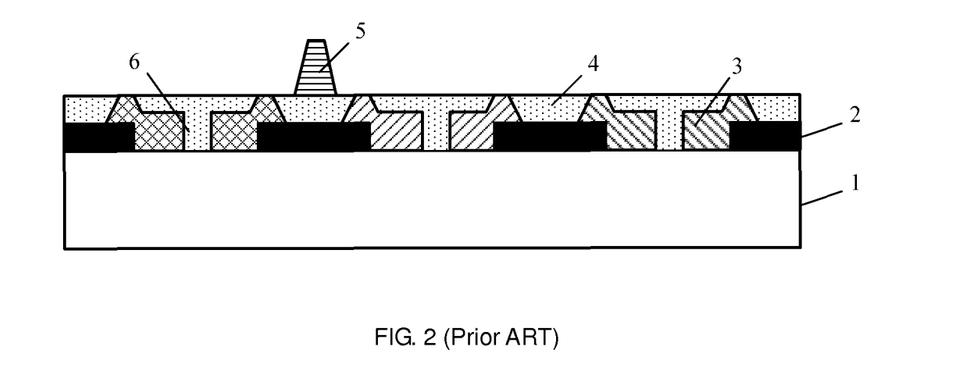
FIG. 2 is a structural representation of a conventional color filter substrate with light holes.

With the development of TFT-LCD technology, the requirement on transmissivity of the color filter substrate is becoming higher and higher. As shown in FIG. 2, in order to improve transmissivity of the color filter substrate, a solution is proposed to design light holes 6 in the color resin layer 3, wherein light holes 6 may be adjusted in their sizes as required, which occupy about 3%~4% area of the sub-pixel area.

Figure 3:
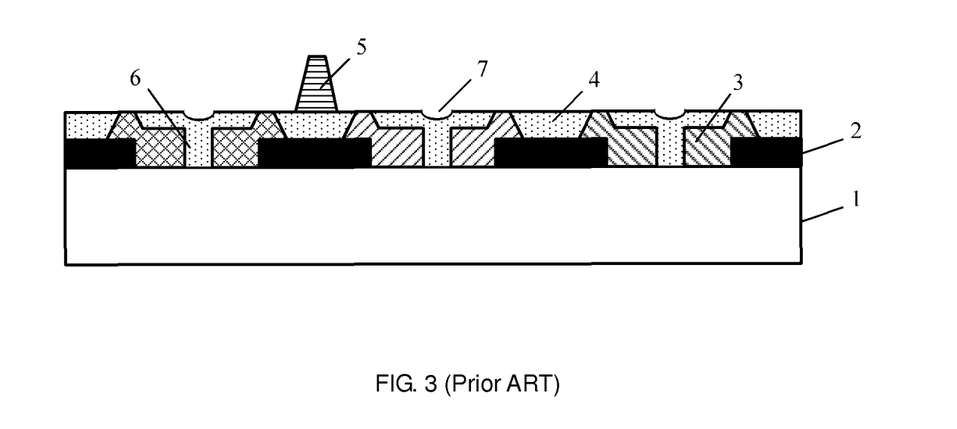
FIG. 3 is a structural representation of a color filter substrate with light holes obtained in real production.

When the color filter substrate is designed with light holes, in the conventional process, an over coat (OC) is typically applied on the black matrix and the color resin layer to form the planarization layer of the color filter substrate and depressions at light holes are filled with the OC material. However, as shown in FIG. 3, while forming the planarization layer 4, due to insufficient filling of OC material at the light holes 6, collapses 7 and too big steps would occur at light holes 6, causing poor alignment of liquid crystal.

SUMMARY

One object of the present invention is to provide a display device, a color filter substrate and a manufacturing method thereof, to address collapses and corner step at light holes on the color filter substrate.

According to one embodiment of the present invention, a color filter substrate is provided, comprising:

a substrate comprising a plurality of pixel regions arranged in matrix;

a color resin layer formed in each of the pixel regions on the substrate; and a transparent pillar formed on the substrate and located in the color resin layer.

In one example, the color filter substrate further includes: a black matrix formed on the substrate, the black matrix having openings for exposing the pixel regions.

In one example, the black matrix is located between the color resin layers in adjacent pixel regions.

In one example, the color filter substrate further includes: a planarization layer formed on the color resin layer.

In one example, the color filter substrate further includes: a spacer formed on the planarization layer.

In one example, the color filter substrate further includes: a transparent conductive layer formed on the planarization layer and a spacer formed on the transparent conductive layer.

In one example, a length direction of the transparent pillar is substantially consistent with a thickness direction of the substrate, and the transparent pillar penetrates the color resin layer.

In one example, the transparent pillar has a length identical with a thickness of the color resin layer.

Another embodiment of the present invention provides a display device including the color filter substrate according to any embodiment of the present invention.

According to yet another embodiment of the present invention, a manufacturing method for a color filter substrate is provided, comprising:

forming a transparent pillar in each of pixel regions on the substrate;

forming a color resin layer in each of the pixel regions with the transparent pillar formed therein, the transparent pillar being in the color resin layer.

In one example, a length direction of the transparent pillar is substantially consistent with a thickness direction of the substrate, and a thickness of the color resin layer equals to a length of the transparent pillar.

In one example, the method further includes: forming a planarization layer on the substrate with the color resin layer formed thereon; forming a spacer on the planarization layer.

In one example, the method further includes: forming a planarization layer on the substrate with the color resin layer formed thereon; forming a transparent conductive layer on the planarization layer; forming a spacer on the transparent conductive layer.

In one example, the method further includes: before forming the transparent pillar, forming a black matrix on the substrate, the black matrix having openings for exposing the pixel regions; and at the same time of forming the transparent pillar, forming a first planarization layer on the black matrix, the transparent pillar having a length greater than a thickness of the first planarization layer.

In one example, a thickness of the transparent pillar equals to a sum of a thickness of the first planarization layer and a thickness of the black matrix.

In one example, the method further includes: after forming the color resin layer, forming a black matrix in regions between the color resin layers of adjacent pixel regions on the substrate.

In one example, a thickness of the black matrix equals to a thickness of the color resin layer.

With the embodiments of the present invention, it is possible to address problems such as collapses and too big corner step at light holes by forming transparent pillar in the color resin layer to increase transmissivity of the color filter substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The present invention provides a color filter substrate including: a substrate comprising a plurality of pixel regions arranged in matrix; a color resin layer formed in each of the pixel regions on the substrate; and a transparent pillar formed on the substrate and located in the color resin layer.

Optionally, the color filter substrate further includes a black matrix formed on the substrate which has openings for exposing the pixel regions.

Optionally, the color filter substrate further includes a planarization layer formed on the color resin layer.

Optionally, the color filter substrate further includes a spacer formed on the planarization layer. In case of a TN mode liquid crystal panel, the color filter substrate further includes a transparent conductive layer formed on the planarization layer. In this case, the spacer is formed on the transparent conductive layer.

With the above-mentioned color filter substrate provided by the present invention, it is possible to address problems such as collapses and too big corner steps at light holes by forming the transparent pillar in the color resin layer to increase transmissivity of the color filter substrate.

For example, the color filter substrate is a transflective color filter substrate and the transparent pillar is disposed in a reflection region of the color filter substrate.

Three specific embodiments of the above-mentioned color filter substrate will be given below.

Embodiment 1

Figure 9:
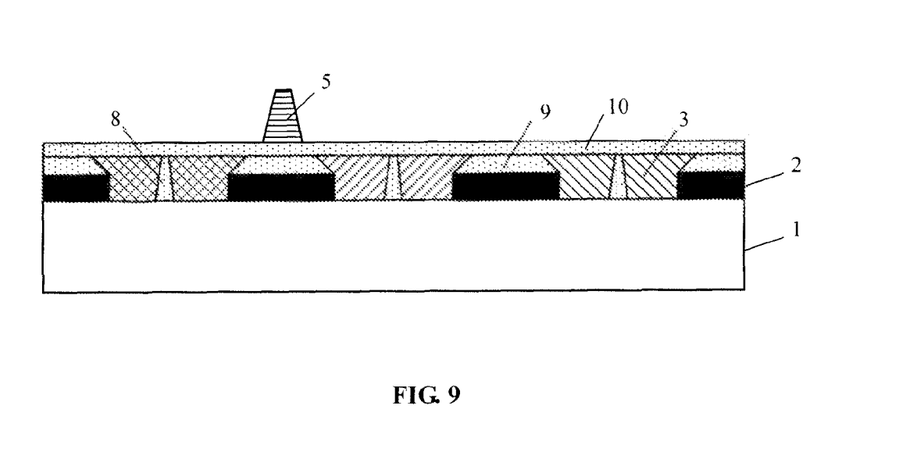

Referring to FIG. 9, the color filter substrate according to embodiment 1 of the present invention includes:

a substrate 1;

a black matrix 2 formed on the substrate 1;

a transparent pillar 8 formed in each of pixel regions exposed via the black matrix 2, and a first planarization layer 9 formed over the black matrix 2, wherein the transparent pillar 8 has a length greater than a thickness of the first planarization layer 9;

a color resin layer 3 formed in each of the pixel regions with the transparent pillar 8 formed therein, wherein the transparent pillar 8 is located in the color resin layer 3, and the color resin layer 3 includes a red resin layer (R, denoted with right oblique lines in figures), a green resin layer (G, denoted with mesh lines in figures) and a blue resin layer (B, denoted with left oblique lines in figures).

For example, a plurality of pixel regions on the substrate 1 may be arranged in a matrix. The black matrix 2 may be located between the color resin layers 3 in adjacent pixel regions so as to expose the pixel regions via the black matrix 2.

For example, the color filter substrate further includes a planarization layer 10 formed on substrate 1 with the color resin layer 3 formed thereon.

For example, the color filter substrate further includes a spacer 5 formed on the planarization layer 10.

For example, the color resin layer 3 has a thickness equal to a length of the transparent pillar 8.

For example, the transparent pillar 8 has a length equal to the sum of the thickness of the first planarization layer 9 and the thickness of the black matrix 2. In addition, the length direction of the transparent pillar 8 is substantially consistent with the thickness direction of the substrate 1, and the transparent pillar 8 penetrates the color resin layer 3. The length of the transparent pillar 8 (dimension in the thickness direction of the substrate) is substantially identical with the thickness of the color resin layer 3.

There is no particular limitation on the shape of the transparent pillar in embodiments of the present invention; it may be of cylinder, prism, truncated cone or any other suitable shapes.

In addition, the above-mentioned planarization layer 10 may be omitted as required, that is, the color filter substrate may not include the planarization layer 10. Then, the spacer 5 is directly formed on the first planarization layer 9.

Furthermore, the color filter substrate may not include the spacer 5. Then, the spacer 5 may be formed on an array substrate.

The above-mentioned color filter substrate may be used in a liquid crystal panel in which pixel electrodes and common electrodes are both disposed on the array substrate, for example, a liquid crystal panel of advanced super dimension switch (ADS) mode. The ADS mode generates a multidimensional electric field by generating electric field at edges of slit electrodes in the same plane and generating electric field between the slit electrode layer and the plate electrode layer, enabling liquid crystal molecules of all orientations between slit electrodes and right above electrodes in the liquid crystal cell to rotate, thereby enhancing work efficiency of liquid crystal and increasing transmission efficiency. ADS mode can improve the picture quality of TFT-LCDs and has advantages of high resolution, high transmissivity, low power dissipation, wide viewing angles, high opening ratio, low chromatic aberration, and no push Mura, etc.

Figure 10:
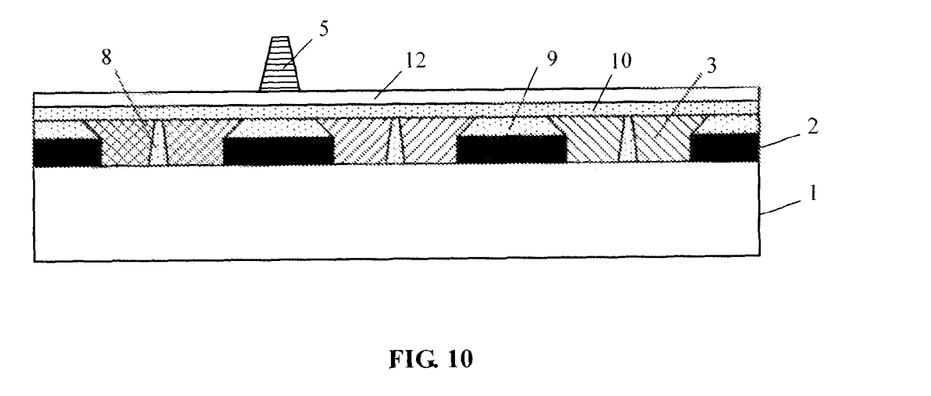

For a color filter substrate for TN mode liquid crystal panel, as shown in FIG. 10, a transparent conductive layer 12 is further formed between the spacer 5 and the planarization layer 10. FIGS. 10 and 9 only differ in that a transparent conductive layer 12 is added. Description of its specific structure will not be given here. Reference may be made to the description of color filter substrate shown in FIG. 9.

Figure 4:
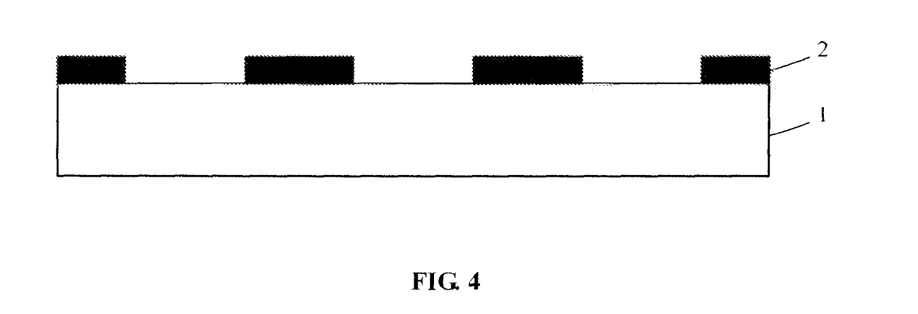
FIGS. 4~10 are sectional views showing manufacturing process of a color filter substrate according to embodiment 1 of the present invention.

The manufacturing method for the above-mentioned color filter substrate is as follows:

Step S11, providing a substrate 1 and forming a black matrix 2 on the substrate 1 (as shown in FIG. 4);

Photoresist material for the black matrix is applied on the substrate 1 and a pattern of the black matrix 2 is formed after exposure and development with a mask.

Figure 5:
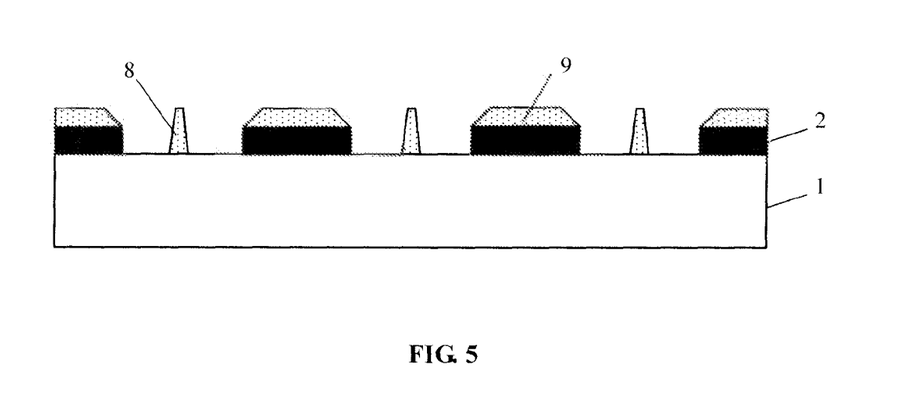

Step S12, forming a first planarization layer 9 on the black matrix 2 with a mask and forming a transparent pillar 8 in each of exposed pixel regions of the black matrix 2 (as shown in FIG. 5);

Firstly, photosensitive OC material is applied on the substrate 1 with the black matrix 2 formed thereon, then the OC material is subjected to exposure, development with the mask to form the first planarization layer 9 and the transparent pillar 8, wherein the transparent pillar 8 has a length greater than the thickness of the first planarization layer 9.

Figure 6:
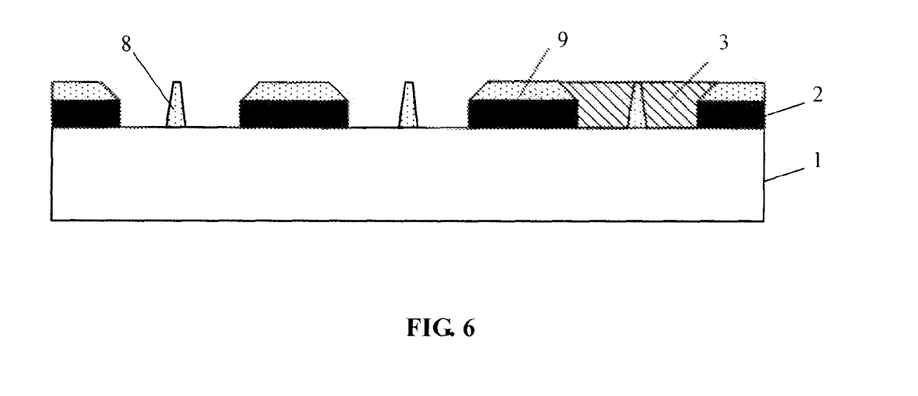
Figure 7:
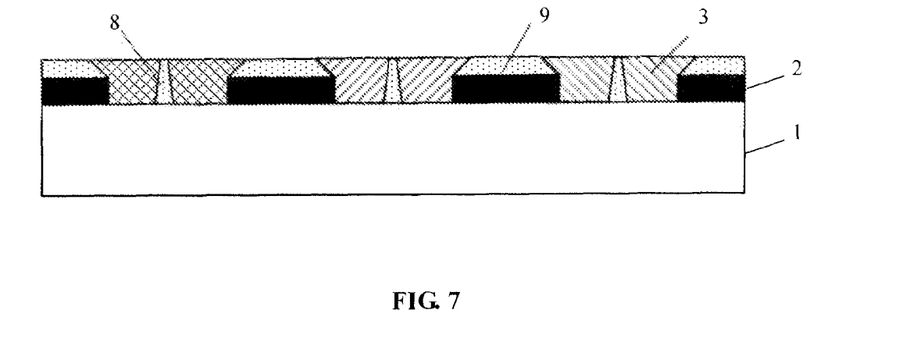

Step S13, forming a color resin layer 3 in each of the pixel regions with the transparent pillar 8 formed therein, wherein the transparent pillar 8 is located in the color resin layer 3 (as shown in FIGS. 6 and 7);

It is possible to apply red resin material on the substrate 1 firstly, then a red resin layer is formed after exposure and development of the red resin material with a mask. The green resin layer and the blue resin layer may be obtained successively with similar approach.

In this step, for application of the color resin material, for example, a slit coating is used to ensure that color resin material is uniformly applied to respective pixel regions and the corner step may be reduced indirectly.

Further, in the above-mentioned step S12, the transparent pillar 8 may have a length equal to the sum of the thickness of the first planarization layer 9 and the thickness of the black matrix 2.

Further, in the above-mentioned step S13, the color resin layer 3 has a thickness equal to the length of the transparent pillar 8.

Figure 8:
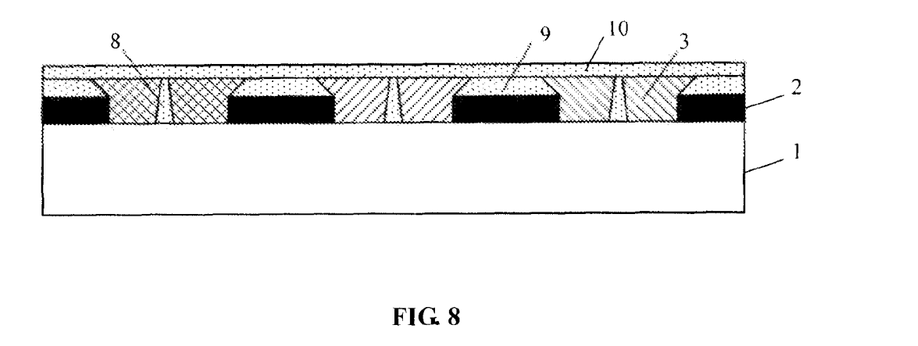

In the above-mentioned manufacturing method for the color filter substrate, it is further possible to include:

Step S14, applying OC material again on the substrate 1 with the black matrix 2 and the color resin layer 3 formed thereon to form the planarization layer 10 (as shown in FIG. 8).

Furthermore, it is further possible to include:

Step S15, forming a spacer 5 on the planarization layer 10 (as shown in FIG. 9).

Among them, step S14 is an optional step, that is, step 14 may be omitted when no planarization layer 10 is designed in the color filter substrate.

Furthermore, step S15 may also be omitted when there is no spacer 5 designed in the color filter substrate (then, the spacer 5 may be formed on the array substrate).

In addition, as described before, in case of a TN mode liquid crystal panel, a step of forming a transparent conductive layer 12 may be further included between steps S14 and S15 when manufacturing the color filter substrate. Then, the spacer 5 is formed on the transparent conductive layer 12.

Embodiment 2

Figure 16:
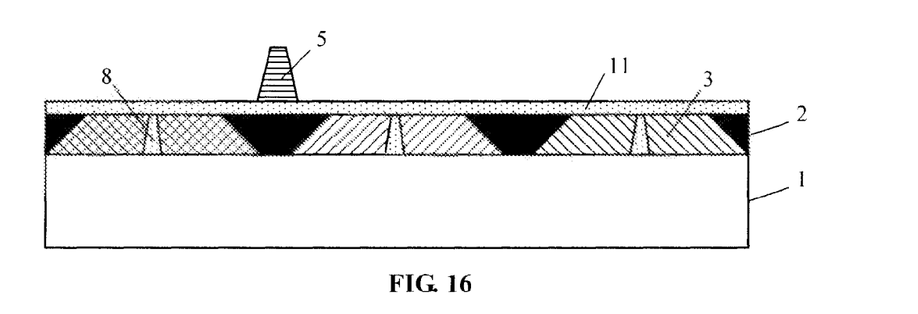

Referring to FIG. 16, the color filter substrate according to embodiment 2 of the present invention includes:

a substrate 1;

a transparent pillar 8 formed in each of pixel regions on the substrate 1;

a color resin layer 3 formed in each of the pixel regions with the transparent pillar 8 formed therein, wherein the transparent pillar 8 is located in the color resin layer 3, and the color resin layer 3 includes a red resin layer (R, denoted with right oblique lines in figures), a green resin layer (G, denoted with mesh lines in figures) and a blue resin layer (B, denoted with left oblique lines in figures);

a black matrix 2 formed on the substrate 1 with the color resin layer 3 formed thereon.

For example, the color filter substrate further includes a planarization layer 11 formed on the substrate 1 with the black matrix 2 and the color resin layer 3 formed thereon.

For example, the color filter substrate further includes a spacer 5 formed on the planarization layer 11.

For example, the color resin layer 3 has a thickness equal to a length of the transparent pillar 8.

For example, the black matrix 2 has a thickness equal to that of the color resin layer 3.

In addition, the above-mentioned planarization layer 11 may be omitted as required, that is, the color filter substrate may not include the planarization layer 11. Then, the spacer 5 is directly formed on the black matrix 2.

Furthermore, the color filter substrate may not include spacer 5. Then, the spacer 5 may be formed on an array substrate.

The above-mentioned color filter substrate may be used in a liquid crystal panel in which pixel electrodes and common electrodes are both disposed on the array substrate, for example, a liquid crystal panel of ADS mode.

Figure 17:
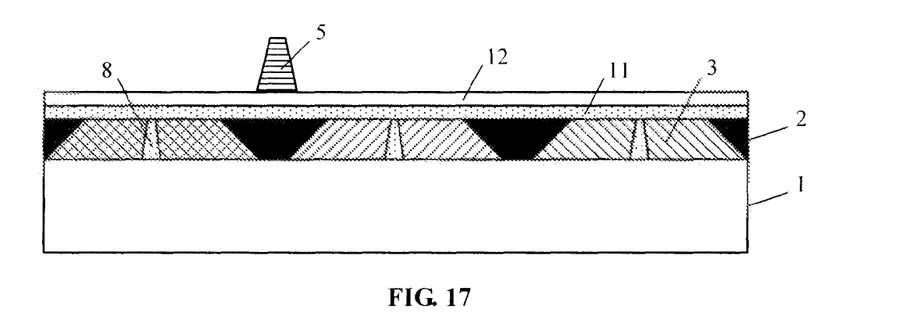

For a color filter substrate of TN mode liquid crystal panel, as shown in FIG. 17, a transparent conductive layer 12 is further formed between the spacer 5 and the planarization layer 11. FIGS. 17 and 16 only differ in that a transparent conductive layer 12 is added. Description of its specific structure will not be given here. Reference may be made to the description of color filter substrate shown in FIG. 16.

Figure 11:
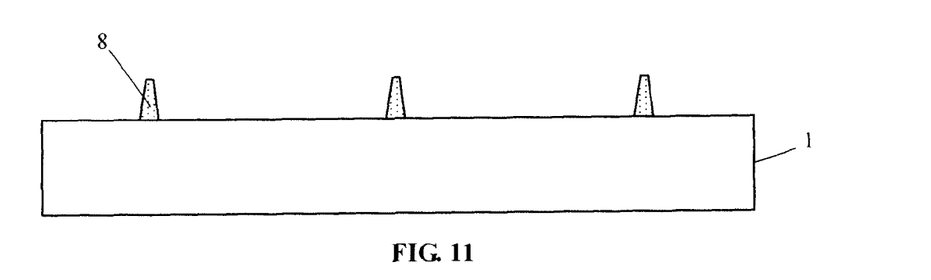
FIGS. 11~17 are sectional views showing manufacturing process of a color filter substrate according to embodiment 2 of the present invention.

The manufacturing method for the above-mentioned color filter substrate is as follows:

Step S21, providing a substrate 1 and forming a transparent pillar 8 in each of pixel regions on the substrate 1 (as shown in FIG. 11);

Firstly, photosensitive OC material is applied on the substrate 1, then the OC material is subjected to exposure and development with a mask to obtain a transparent pillar 8.

Figure 12:
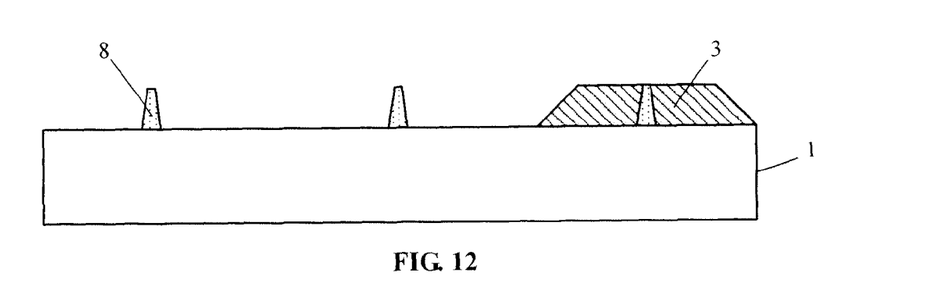
Figure 13:
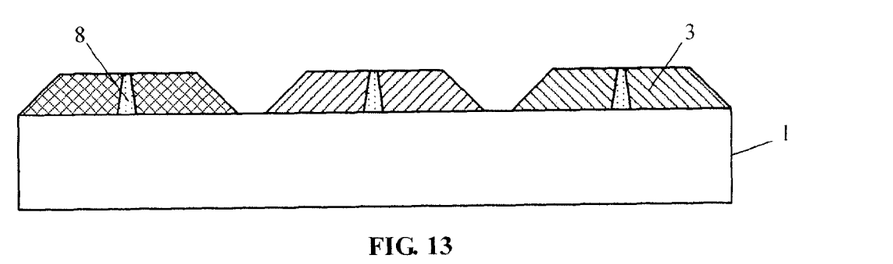

Step S22, forming a color resin layer 3 in each of the pixel regions with the transparent pillar 8 formed therein, wherein the transparent pillar 8 is located in the color resin layer 3 (as shown in FIGS. 12 and 13);

It is possible to apply a red resin material on the substrate 1 firstly, then a red resin layer is formed after exposure and development of the red resin material with a mask. The green resin layer and the blue resin layer may be obtained successively with similar approach.

Figure 14:
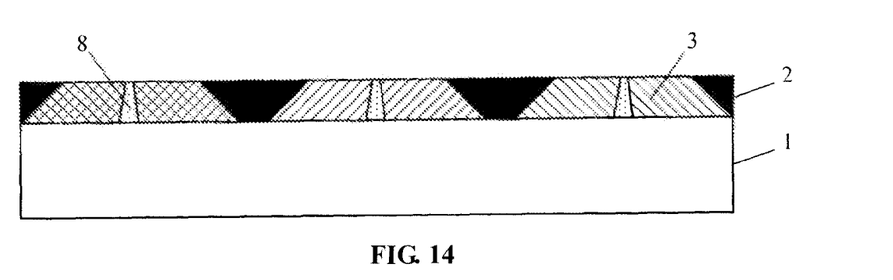

Step S23, forming a black matrix 2 on the substrate 1 with the color resin layer 3 formed thereon (as shown in FIG. 14);

Photoresist material for the black matrix is applied on the substrate 1 and a pattern of the black matrix 2 is formed after exposure and development with a mask.

In this step, for application of the photoresist material for black matrix, for example, a slit coating is used to ensure that photoresist material for black matrix is uniformly applied to respective non-pixel regions and corner step is reduced indirectly.

Further, in the above-mentioned step S22, the color resin layer 3 has a thickness equal to the length of the transparent pillar 8.

Further, in the above-mentioned step S23, the black matrix 2 has a thickness equal to that of the color resin layer 3.

Figure 15:
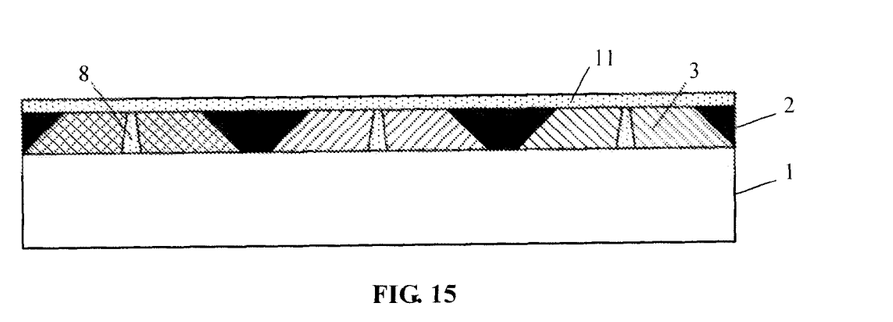

In the above-mentioned manufacturing method for the color filter substrate, it is further possible to include:

Step S24, applying OC material again on the substrate 1 with the black matrix 2 and the color resin layer 3 formed thereon to form the planarization layer 11 (as shown in FIG. 15).

Furthermore, it is further possible to include:

Step S25, forming a spacer 5 on the planarization layer 11 (as shown in FIG. 16).

Among them, step S24 is an optional step, that is, step 24 may be omitted when no planarization layer 11 is designed in the color filter substrate.

Furthermore, step S25 may also be omitted when there is no spacer 5 designed in the color filter substrate (then, the spacer 5 may be formed on the array substrate).

In addition, as described before, in case of a TN mode liquid crystal panel, a step of forming a transparent conductive layer 12 may be further included between steps S24 and S25 when manufacturing the color filter substrate. Then, the spacer 5 is formed on the transparent conductive layer 12.

Embodiment 3

Figure 22:
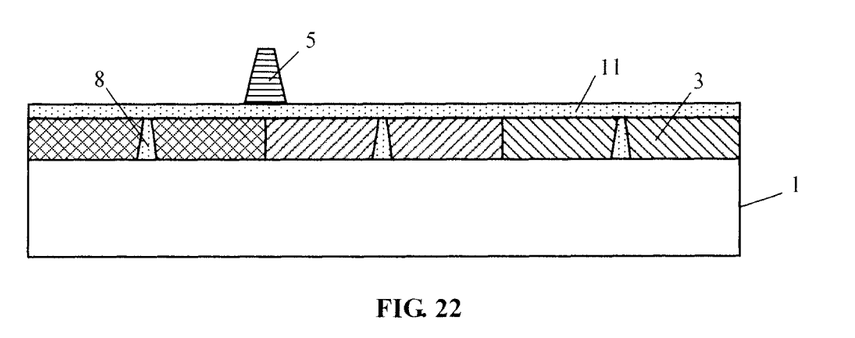

Referring to FIG. 22, the color filter substrate according to embodiment 3 of the present invention includes:

a substrate 1;

a transparent pillar 8 formed in each of pixel regions on the substrate 1;

a color resin layer 3 formed in each of the pixel regions with the transparent pillar 8 formed therein, wherein the transparent pillar 8 is located in the color resin layer 3, and the color resin layer 3 includes a red resin layer (R, denoted with right oblique lines in figures), a green resin layer (G, denoted with mesh lines in figures) and a blue resin layer (B, denoted with left oblique lines in figures).

For example, the color filter substrate further includes a planarization layer 11 formed on the color resin layer 3.

For example, the color filter substrate further includes a spacer 5 formed on the planarization layer 11.

For example, the color resin layer 3 has a thickness equal to the length of the transparent pillar 8.

In addition, the above-mentioned planarization layer 11 may be omitted as required, that is, the color filter substrate may not include the planarization layer 11. Then, the spacer 5 is directly formed on the color resin layer 3.

Furthermore, the color filter substrate may not include the spacer 5. Then, the spacer 5 may be formed on an array substrate.

The above-mentioned color filter substrate may be used in a liquid crystal panel in which pixel electrodes and common electrodes are both disposed on the array substrate, for example, a liquid crystal panel of ADS mode.

Figure 23:
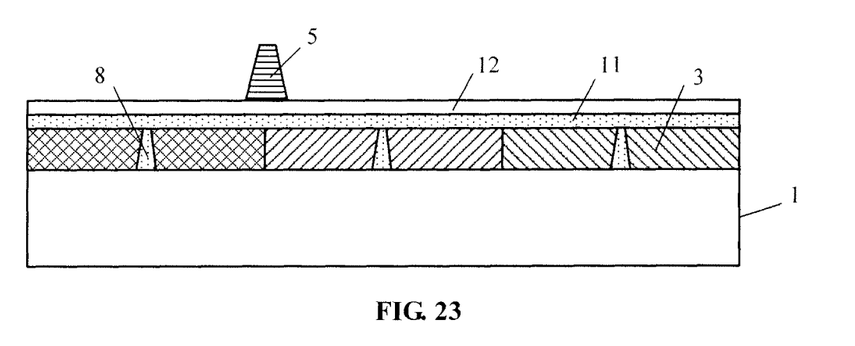

For a color filter substrate for TN mode liquid crystal panel, as shown in FIG. 23, a transparent conductive layer 12 is further formed between the spacer 5 and the planarization layer 11. FIGS. 23 and 22 only differ in that a transparent conductive layer 12 is added. Description of its specific structure will not be given here. Reference may be made to the description of color filter substrate shown in FIG. 22.

Figure 18:
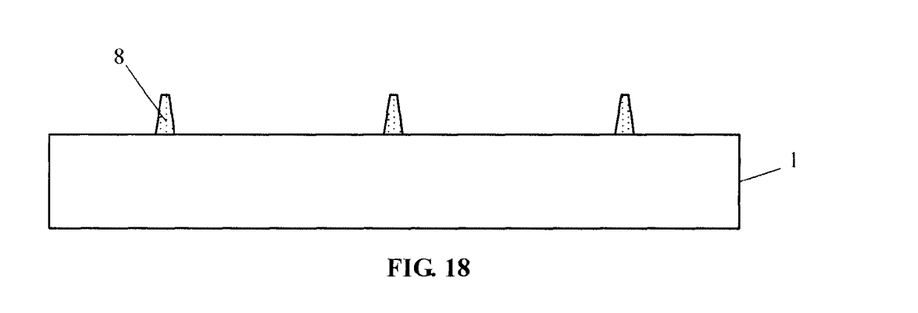
FIGS. 18~23 are sectional views showing manufacturing process of a color filter substrate according to embodiment 3 of the present invention.

The manufacturing method for the above-mentioned color filter substrate is as follows:

Step S31, providing a substrate 1 and forming a transparent pillar 8 in each of pixel regions on the substrate 1 (as shown in FIG. 18);

Firstly, photosensitive OC material is applied on the substrate 1, then the OC material is subjected to exposure and development with a mask to obtain the transparent pillar 8.

Figure 19:
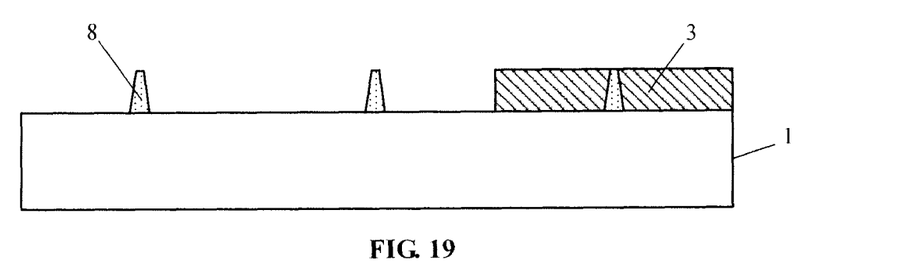
Figure 20:
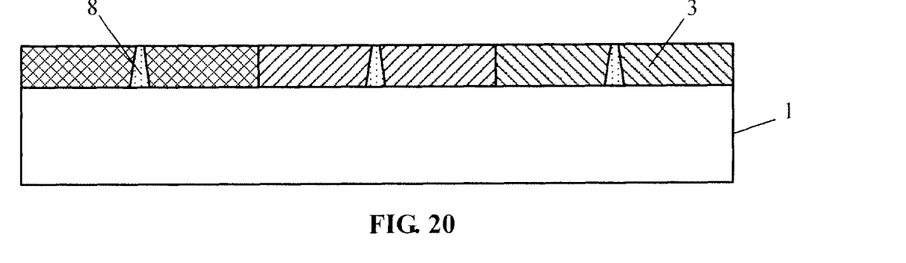

Step S32, forming a color resin layer 3 in each of the pixel regions with the transparent pillar 8 formed therein, wherein the transparent pillar 8 is located in the color resin layer 3 (as shown in FIGS. 19 and 20);

It is possible to apply red resin material on the substrate 1 firstly, then a red resin layer is formed after exposure and development of the red resin material with a mask. The green resin layer and the blue resin layer may be obtained successively with similar approach.

Further, in the above-mentioned step S32, the color resin layer 3 has a thickness equal to the length of the transparent pillar 8.

Figure 21:
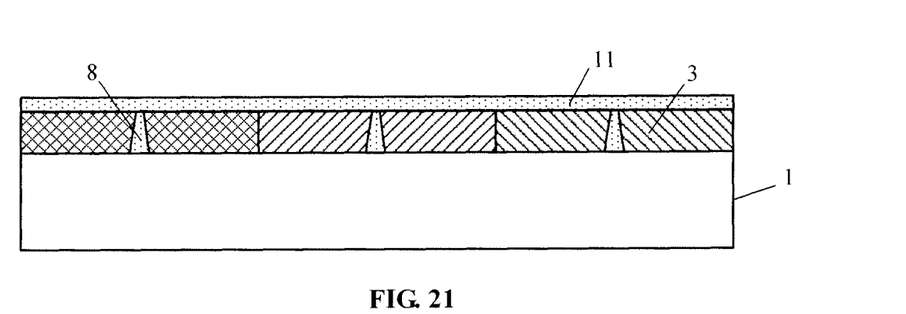

In the above-mentioned manufacturing method for the color filter substrate, it is further possible to include:

Step S33, applying OC material again on the color resin layer 3 to form the planarization layer 11 (as shown in FIG. 21).

Furthermore, it is further possible to include:

Step S34, forming a spacer 5 on the planarization layer 11 (as shown in FIG. 22).

Among them, step S33 is an optional step, that is, step 33 may be omitted when no planarization layer 11 is designed in the color filter substrate.

Furthermore, step S34 may also be omitted when there is no spacer 5 designed in the color filter substrate (then, the spacer 5 may be formed on the array substrate).

In addition, as described before, in case of a TN mode liquid crystal panel, a step of forming transparent conductive layer 12 may be further included between steps S33 and S34 when manufacturing the color filter substrate. Then, the spacer 5 is formed on the transparent conductive layer 12.

The above-mentioned three embodiments effectively reduce collapse at light holes, reduce corner step, improve liquid crystal alignment and increase the yield rate of products by improving pattern distribution. Embodiments of the present invention may be applied to color filter substrate of transflective type, and also to other types of color filter substrates that need openings in the pixel regions.

Embodiments of the present invention further provide a display device including any one of the above-mentioned color filter substrates. The display device may be a liquid crystal panel, a mobile phone, a flat computer, a TV set, a display, a notebook computer, a digital photo frame, a navigator and any other products or components with display function.

In summary, with the embodiments of the present invention, it is possible to address problems such as collapses and too big corner step at light holes by forming the transparent pillar in the color resin layer to increase transmissivity of the color filter substrate.

The foregoing are merely exemplary embodiments of the invention, but are not used to limit the protection scope of the invention. The protection scope of the invention shall be defined by the attached claims.

What is claimed is:

1. A color filter substrate comprising:
a substrate comprising a plurality of pixel regions arranged in matrix;
a color resin layer formed in each of the pixel regions on the substrate;
and a transparent pillar formed on the substrate and located in the color resin layer;
wherein the transparent pillar has a length identical with a thickness of the color resin layer, and
wherein the transparent pillar has a cross-sectional area sequentially reduced along a direction away from the substrate.

2. The color filter substrate according to claim 1, further comprising:
a black matrix formed on the substrate, the black matrix having openings for exposing the pixel regions.

3. The color filter substrate according to claim 2, wherein the black matrix is located between the color resin layers in adjacent pixel regions.

4. The color filter substrate according to claim 1, further comprising:
a planarization layer formed on the color resin layer.

5. The color filter substrate according to claim 4, further comprising:
a spacer formed on the planarization layer.

6. The color filter substrate according to claim 4, further comprising: a transparent conductive layer formed on the planarization layer and a spacer formed on the transparent conductive layer.

7. The color filter substrate according to claim 1, wherein a length direction of the transparent pillar is consistent with a thickness direction of the substrate, and the transparent pillar penetrates the color resin layer.

8. A display device comprising the color filter substrate according to claim 1.

9. A manufacturing method for a color filter substrate comprising:
forming a transparent pillar in each of pixel regions on the substrate;
after forming the transparent pillar, forming a color resin layer in each of the pixel regions with the transparent pillar formed therein, the transparent pillar being in the color resin layer, a thickness of the color resin layer equals to a length of the transparent pillar, and
wherein the transparent pillar has a cross-sectional area sequentially reduced along a direction away from the substrate.

10. The manufacturing method according to claim 9, wherein a length direction of the transparent pillar is consistent with a thickness direction of the substrate.

11. The manufacturing method according to claim 9, further comprising: forming a planarization layer on the substrate with the color resin layer formed on the substrate;
forming a spacer on the planarization layer.

12. The manufacturing method according to claim 9, further comprising:
forming a planarization layer on the substrate with the color resin layer formed on the substrate;
forming a transparent conductive layer on the planarization layer;
forming a spacer on the transparent conductive layer.

13. The manufacturing method according to claim 9, further comprising:
forming a black matrix on the substrate;
forming a first planarization layer on the black matrix, forming the transparent pillar in each of pixel regions exposed via the black matrix, the transparent pillar having a length greater than a thickness of the first planarization layer, and
forming a color resin layer in each of the pixel regions with the transparent pillar formed therein, the transparent pillar being in the color resin layer.

14. The manufacturing method according to claim 13, wherein: a thickness of the transparent pillar equals to a sum of a thickness of the first planarization layer and a thickness of the black matrix.

15. The manufacturing method according to claim 9, further comprising:
forming a black matrix on the substrate with the color resin layer formed on the substrate.

16. The manufacturing method according to claim 15, wherein:
a thickness of the black matrix equals to a thickness of the color resin layer.

* * * * *